May 14, 1968

P. B. ZEIGLER ET AL 3,382,944

AUTOMATIC CONTROL FOR ADJUSTABLE STEERING COLUMN

Filed March 17, 1966

INVENTORS
Philip B. Zeigler &
Floyd A. Schluckebier
W. F. Wagner
ATTORNEY

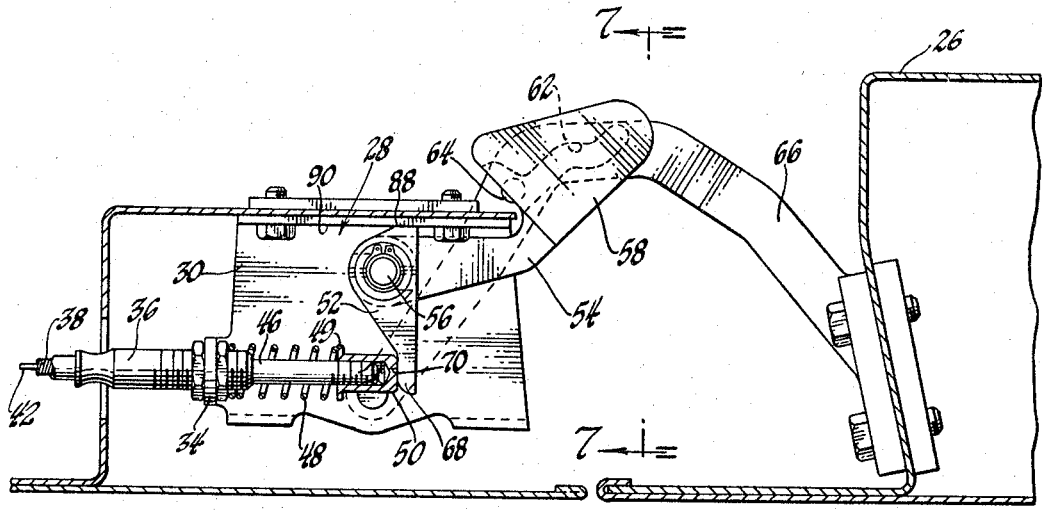
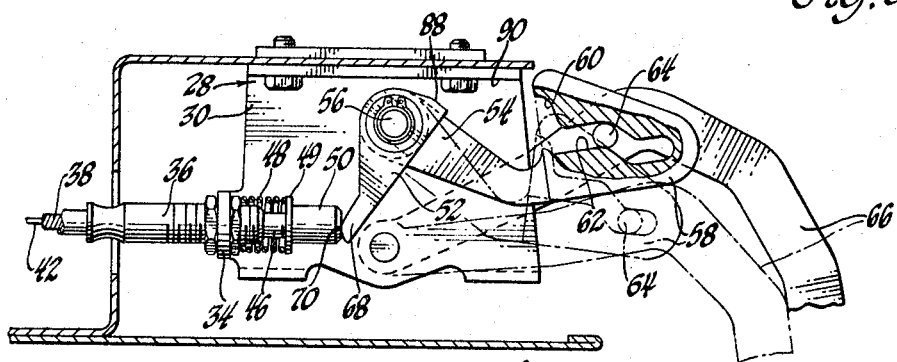

United States Patent Office 3,382,944
Patented May 14, 1968

3,382,944
AUTOMATIC CONTROL FOR ADJUSTABLE
STEERING COLUMN
Philip B. Zeigler, Saginaw, and Floyd A. Schluckebier, Frankenmuth, Mich., assignors to General Motors Corporation, Detroit, Mich., a corporation of Delaware
Filed Mar. 17, 1966, Ser. No. 535,183
4 Claims. (Cl. 180—111)

ABSTRACT OF THE DISCLOSURE

Mechanism for releasing a normally latched multiple increment tilt steering wheel assembly for movement to its uppermost tilt position upon initial door opening movement and including overtravel mechanism enabling restoration of latching during subsequent opening and closing movement of the door.

---

This invention relates to adjustable steering mechanisms and more particularly to mechanism associated with a vehicle door operative responsive to opening movement thereof to automatically induce displacement of the steering wheel to a position permitting easy ingress and egress.

In recent years, a large number of production vehicles have been equipped with so-called tilt steering wheels which permit selective inclination of the plane of rotation of the steering wheel through a predetermined range of angular positions above and below a plane normal to the axis of rotation of the steering shaft. Typical of such constructions is U.S. 3,167,971 Zeigler et al., assigned to the assignee of this application.

Utilization of steering assemblies of the type described confer two distinct operational benefits: one in terms of actual vehicle operation and the other in terms of entrance and egress. In the former case, a plane of rotation of the steering wheel may be selected which is comfortable and convenient for the individual's stature and seating position. In the latter case, the tilt mechanism is manually released allowing the wheel to swing upwardly to the maximum position of inclination to afford optimum space between the wheel and seat during ingress and egress. In the prior art tilt mechanisms, both functions are accomplished by manually manipulating a steering column mounted lever to disengage the locking or latching mechanism which normally holds the tilting portion of the steering assembly in the various incremental positions of adjustment.

An object of the present invention is to provide an improved tilt steering wheel control mechanism enabling full upward tilting of the wheel to occur automatically upon opening movement of the vehicle door adjacent to the wheel, while normal operation of the steering column mounted lever is restored when the vehicle door resumes the closed position.

A further object is to provide a direct motion translating mechanism for an arrangement of the type described which includes means permitting continued opening movement of the door after release of the tilt mechanism has been accomplished.

Another object is to provide a door actuated tilt steering wheel release mechanism including means for automatically locking the wheel in the full upward tilt position while the door is in open position.

These and other objects, advantages and features of the invention will become more readily apparent as reference is had to the accompanying specification and drawings wherein:

FIGURE 5 is an enlarged fragmentary view, partly in section, of a portion of the latch releasing mechanism associated with the vehicle door;

FIGURE 6 is a view similar to FIGURE 5 illustrating the relative position of the parts in two sequential steps of door opening movement;

FIGURE 7 is a view looking in the direction of arrows 7—7 of FIGURE 5; and

FIGURE 8 is a fragmentary exploded view of a portion of the mechanism shown in FIGURE 5.

Figure 1:
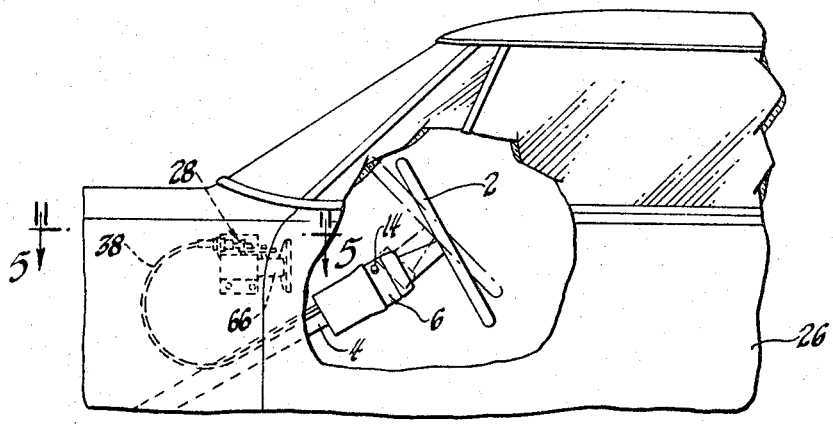
FIGURE 1 is a fragmentary side elevational view of a portion of a conventional vehicle, parts being broken away to show the general location and range of movement of a tilt steering wheel mechanism, together with a door actuated release mechanism shown in dotted lines.
Figure 2:
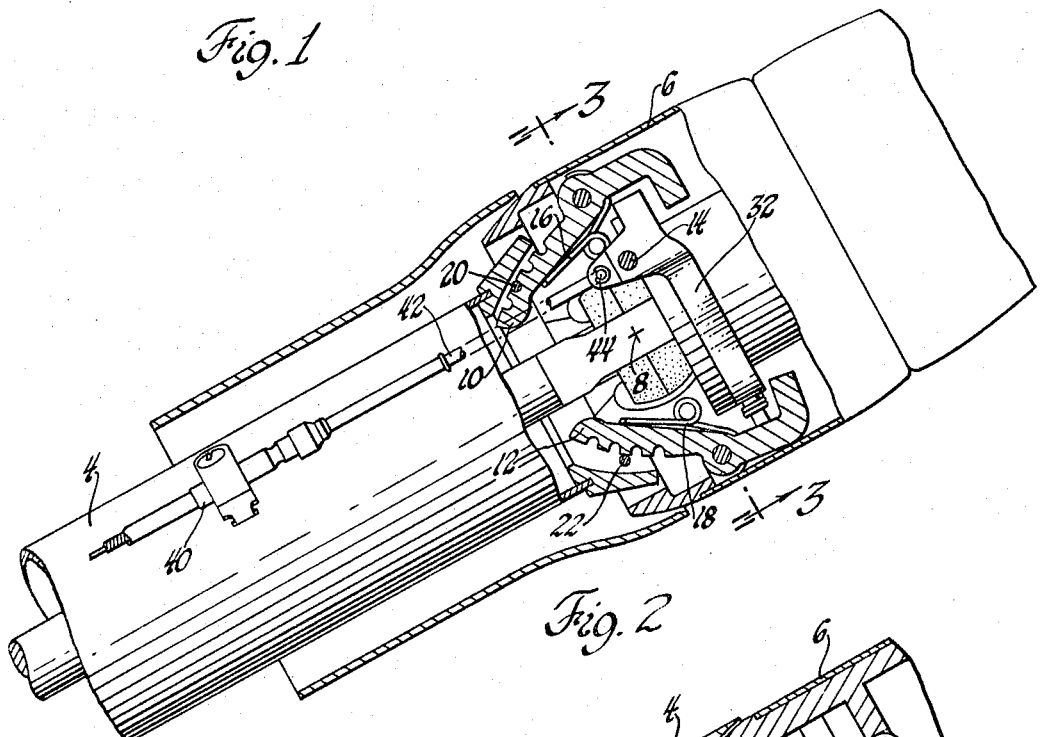
FIGURE 2 is an enlarged side elevational view, partly in section and with parts broken away, illustrating certain details of construction of a column assembly incorporating the invention.
Figure 3:
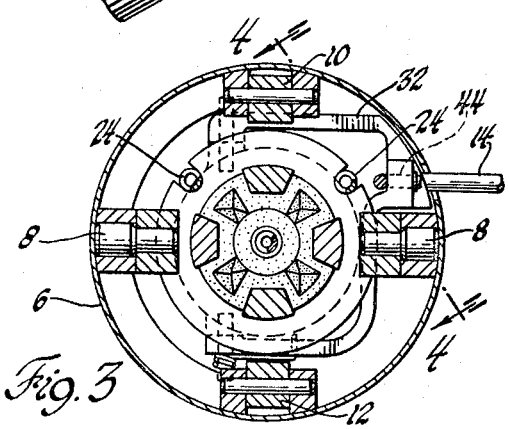
FIGURE 3 is a view looking in the direction of arrows 3—3 of FIGURE 2.

In FIGURE 1 of the drawings, there is shown a portion of a vehicle equipped with a steering column assembly of the type wherein the steering wheel 2 is capable of tilting adjustment in a vertical plane through a range of fixed positions above and below the normal position of axial alignment with the lower steering column portion 4. The general construction and mode of operation of the structure shown in FIGURES 1, 2 and 3 correspond to that illustrated and described in U.S. 3,167,971 Zeigler et al. Accordingly, for a complete description of the detailed elements and mode of operation of the mechanism per se, reference may be had thereto. For purposes of the present invention, suffice it to say that steering wheel 2 and the upper portion 6 of the steering column associated therewith are tiltable about a transverse axis 8 upon release of latch mechanisms 10 and 12 induced by manual upward displacement of a handle 14, extending transversely from the column portion 6. Upon release of the handle, one or the other of latch mechanisms 10 or 12 under the influence of springs 16 or 18 engages pin 20 or 22 to maintain the upper portion 6 and wheel 2 in a selected plane of rotation during operation of the vehicle.

Figure 4:
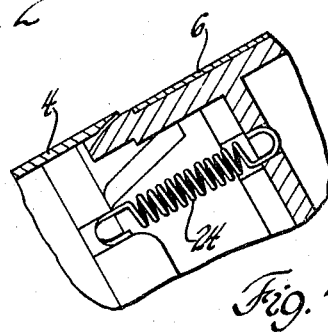
FIGURE 4 is a view looking in the direction of arrows 4—4 of FIGURE 3.

As seen in FIGURE 4, an additional spring 24 is disposed between the lower column portion 4 and the upper column portion 6 in a manner causing the latter to be biased counterclockwise to a fully upwardly tilted position whenever the handle 14 is displaced upwardly.

In order to cause the steering wheel 2 to move to its maximum upwardly tilted position whenever the vehicle door 26 is opened, in accordance with the present invention a direct acting motion translating mechanism 28 is interposed between the upper door hinge assembly 30 and the latch release ring 32 with which handle 14 is associated.

As seen best in FIGURES 5, 6 and 7, hinge assembly 30 is formed with an aperture upturned tab 34 in which is threadably secured the sleeve end 36 of a Bowden cable sheath 38. Cable sheath 38 extends into the vehicle body interior and has its opposite end 40 clamped in a fixed position on the fixed steering column portion 4. A Bowden wire or cable 42 in turn is connected at one end to ring member 32 by pin 44 and extends through sheath 38 with its opposite end connected to a plunger 46 reciprocably disposed in sleeve end 36. Plunger 46 in turn is surounded by a coil spring 48, one end of which seats on sleeve end 36 while the other end engages the flanged end 49 of a cap structure 50 threaded on the end of the plunger. It will be evident that spring 48 continuously urges Bowden cable 42 in a direction causing displacement of the latch releasing ring 32 away from engagement with latches 10 and 12. In order to impart opposite axial movement to Bowden cable 42 and thereby effect release of latches 10 and 12, hinge assembly 30 includes a detent member 52 and a lever member 54 which are coaxially mounted on an upstanding pin 56 and normally connected together for concurrent movement. As seen in FIGURES 5 and 6, the free end of lever member 54 extends rearwardly and is formed with a folded end portion 58, the lower wall 60 of which defines a slot 62 straddling a pin 64 projecting upwardly from door hinge arm 66. The free end 68 of detent member 52 in turn extends laterally outwardly so that the forward face 70 thereof abuts cap 50. In operation, pin 64 on hinge arm 66 moves into tracking engagement with the slot 62 upon outward swinging movement of the vehicle door causing lever 54 to move angularly therewith. Since lever 54 and detent 52 are normally coupled for concurrent angular movement, initial opening movement of the door causes detent member 52 to swing clockwise and impart axial forward movement to plunger 46 and Bowden wire 42 sufficient to disengage latches 10 and 12 and enable steering wheel 2 to tilt upwardly to its maximum inclination under the influence of spring 24.

As soon as such axial forward movement of plunger 46 has caused the coil spring 48 to reach its maximum mechanical limits of compression, as shown in FIGURE 6, plunger 46 thereafter resists further angular movement of detent 52.

Therefore, according to another feature of the invention, in order to permit continued angular movement of lever 54 after detent 52 has reached its maximum clockwise angular position and thus enable the vehicle door to be swung to its full open position, detent 52 and lever 54 are provided with axially abutting surfaces 72 and 74 which are formed respectively with a transverse rib 76 and transverse slot 78. Rib 76 is normally maintained in nesting engagement with slot 78 by a Belleville spring 80 surrounding pin 56 which biases surface 72 into abutting engagement with surface 74. However, when detent 52 has reached its maximum clockwise position of movement, further clockwise angular movement of lever 54 induced by continued door opening movement causes rib 76 to climb the inclined ramps 82 and 84 in slot 78 against the pressure of Belleville spring 80 and enable independent angular movement of lever 54 relative to detent 52.

According to another feature of the invention, disengagement of rib 76 and slot 78 effected by continued door opening movement also permits detent 52 to move counterclockwise under the influence of spring 48 until the abutment portion 88 thereon engages vertical wall portion 90 of hinge assembly 30. Since the return movement of detent 52 thus effected is accompanied by axial rearward displacement of Bowden wire 42, latch release ring 32 moves away from latches 10 and 12 which then reengage pins 20 or 22 and lock the steering wheel in the fully upwardly tilted position. The vehicle operator is thus able to grip the steering wheel to assist in entering and leaving the vehicle.

Upon return movement of the vehicle door to its closed position, lever 54 rotates counterclockwise about pin 56 as slot 62 follows pin 64 on hinge arm 66. Just prior to door 26 achieving a fully closed position, the slot 78 of lever 54 reengages rib 76 in detent 52 and restores the normal angular relationship therebetween for repeat cycles.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:
1. In a motor vehicle having a steering assembly including manually releasable mechanism for tiltably adjusting the steering wheel through a range of angular positions, a vehicle door hingedly mounted on said vehicle adjacent said wheel movable from a closed to an open position, axially displaceable means extending between said door and said mechanism for releasing said mechanism upon predetermined movement in one direction, and means associated with said door operable upon opening movement thereof to directly actuate said axially displaceable means in said one direction, said last mentioned means comprising a lever and detent mounted for concurrent angular movement with said door.

2. The invention of claim 1 wherein said lever operatively engages said door and said detent operatively engages said axially displaceable means.

3. The invention of claim 2 wherein said lever and detent are coaxially mounted.

4. The invention of claim 3 wherein said lever and detent are coupled together by overtravel mechanism enabling continued opening movement of said door after occurrence of said predetermined movement of said axially displaceable means.

References Cited
UNITED STATES PATENTS

| | | | |
|---|---|---|---|
| 2,913,066 | 11/1959 | Leslie et al. | 180—111 |
| 2,945,546 | 7/1960 | Niederoest | 180—111 |
| 3,167,971 | 2/1965 | Zeigler et al. | 74—493 |
| 3,199,625 | 8/1965 | Liebreich | 180—78 X |

FOREIGN PATENTS 1,143,724  3/1963  Germany.

KENNETH H. BETTS, *Primary Examiner.*